Oct. 17, 1933.   A. S. FITZ GERALD   1,931,069
ELECTRORESPONSIVE APPARATUS
Filed Dec. 4, 1931

Inventor:
Alan S. FitzGerald,
by Charles E. Tullar
His Attorney.

Patented Oct. 17, 1933

1,931,069

UNITED STATES PATENT OFFICE 1,931,069

ELECTRORESPONSIVE APPARATUS

Alan S. Fitz Gerald, Wynnewood, Pa., assignor to General Electric Company, a corporation of New York Application December 4, 1931. Serial No. 578,898

12 Claims. (Cl. 175—294)

My invention relates to improvements in electroresponsive apparatus which operates in response to the phase relation between two coexisting electric quantities, i. e., similar components of electric energy and more particularly to fault responsive apparatus which operates selectively in accordance with the direction of power flow in a circuit. One object of my invention is to provide improved electroresponsive apparatus which has a high degree of sensitivity at a minimum power requirement especially where any power necessary to the operation of the apparatus has to be derived from the potential of a circuit. Another object of my invention is to reduce or eliminate the sluggishness due to the inertia of moving parts whereby to obtain quick response.

In certain electroresponsive devices, such as power directional relays whose operation is dependent on the voltage of the circuit to be protected, the voltage is usually the least just when the relay should operate. For the purpose of obtaining reliable and sensitive operation under these conditions many expedients have been proposed. These largely involve complications which, generally speaking, are undesirable. Moreover, the necessary potential transformers, especially for high voltage circuits are costly. Furthermore, the relays involve moving parts whose inertia tends to sluggish operation besides imposing an appreciable power demand on the potential transformers. In accordance with my invention, I propose to reduce or eliminate these difficulties by electric discharge valve apparatus which is responsive to the phase relation between two coexisting electric quantities by virtue of voltages derived therefrom and whose power requirements, particularly where voltage control is involved, are a minimum, so that suitable working voltages can be derived from comparatively inexpensive devices such as condenser bushings and the like, examples of which are well known to the art and so that even with the usual small voltages accompanying a power reversal due to a fault on a circuit to be protected, reliable and sensitive operation is assured.

My invention will be better understood from the following description when considered in connection with the accompanying drawing and its scope will be pointed out in the appended claims.

Figure 1:
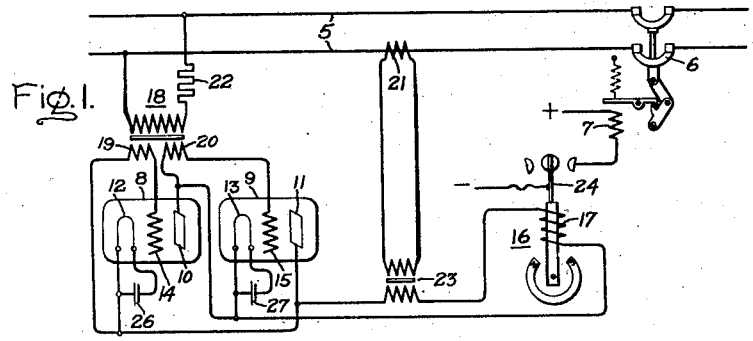
Figure 2:
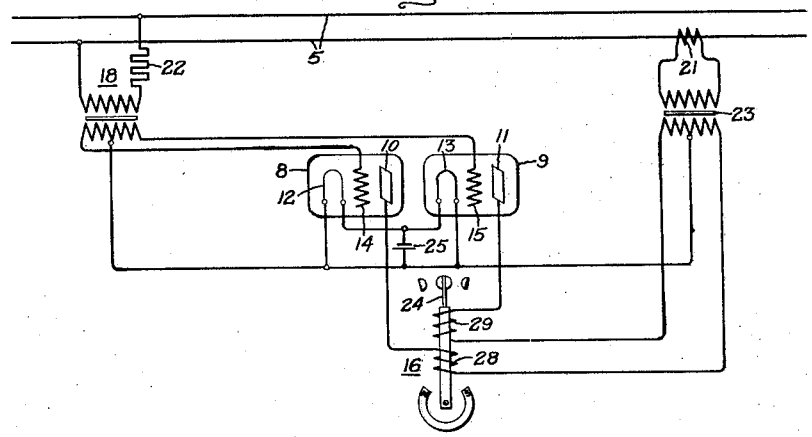
Figure 3:
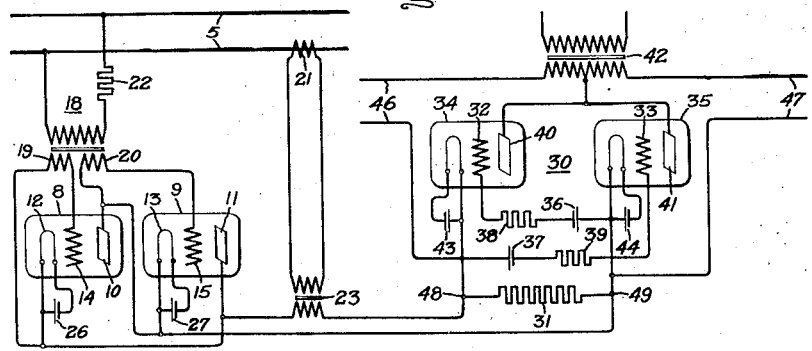
Figure 4:
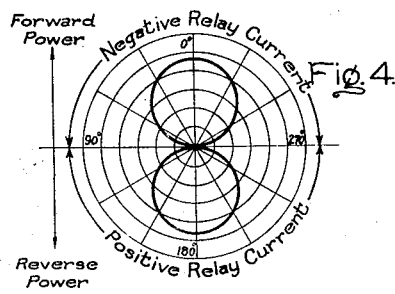

In the accompanying drawing, Fig. 1 illustrates diagrammatically electroresponsive apparatus embodying my invention Figs. 2 and 3 illustrate diagrammatically modifications of my invention, and Fig. 4 is a curve diagram explanatory of my invention.

In Fig. 1, I have illustrated my invention as applied to the protection of an alternating current circuit 5 against faults causing a reversal of power. As shown, the circuit is provided with suitable circuit interrupting means such as a latched closed circuit breaker 6 having a trip coil 7.

According to my invention, I provide a plurality of electric discharge valves 8, 9, having anodes 10, 11; cathodes 12, 13 and control electrodes 14, 15 respectively, the control electrodes being connected to be energized in accordance with one electric quantity of the circuit and the anodes in accordance with another coexisting electric quantity of the circuit. The relative polarities of the connections of the control electrodes and anodes are such that one valve is conductive when a predetermined phase relation exists between the quantities energizing these electrodes and non-conductive when the phase relation between the quantities differs by substantially 180° from said predetermined phase relation and another valve is non-conductive when said predetermined phase relation exists and conductive when the phase relation differs by substantially 180° from the predetermined phase relation. Further, in accordance with my invention, I provide suitable means 16, such for example as a direct current type of polarized directional relay whose operating winding 17 is connected to be energized in accordance with the difference between the currents in the anode circuits of the valves 8 and 9.

As shown in Fig. 1, the control electrodes 14, 15 are so connected to be energized in accordance with a voltage of the circuit 5 from suitable means such as a transformer 18, having secondary windings 19, 20, as to have the same polarity. The anodes 10, 11, however, are so connected to be energized in accordance with a current of the circuit from suitable means, such as a current transformer 21, as to have opposite polarities. In order to obtain a desired initial phase displacement between the control electrode voltage and the anode current suitable phase displacing means, examples of which are well known to the art, may be employed, the arrangement shown in Fig. 1 including the impedance of the transformer and the resistance 22 in circuit therewith which may be so proportioned that the polar curve of operation shown in Fig. 4 is symmetrically located with respect to the power axes. Also for any desired current transformation ratio a suitable intermediate transformer 23 may be employed. The double secondary winding transformer 18 is used with the arrangement shown in Fig. 1 since by reason of the anode polarities being opposite, the cathodes 12, 13 are not at the same potential.

Assuming a power factor of plus unity (+1) that is, power flow in normal direction with the current and the voltage in phase, then during alternate half-cycles one valve, for example, valve 8, is conductive because its anode and control electrode voltages are simultaneously positive during these half-cycles and during the other half of the cycles the valve is not conductive because its anode and control electrode voltages are both negative. The valve 9 is non-conductive all the time because during each half-cycle one of its electrode voltages either anode or control electrode is negative. Consequently, a unidirectional current is supplied to the relay winding 17 in such a direction as to tend to move its movable circuit controlling member 24 to the left.

Assuming now a power factor of minus unity (−1) that is, a reversal of power from the normal direction with current and voltage 180° out of phase, then the valve 8 is non-conductive all the time because during each half-cycle either its anode or control electrode voltage is negative. The valve 9 is conductive during alternate half-cycles because its anode and control electrode voltages are then simultaneously positive. Consequently a unidirectional current is supplied to the relay winding 17 in a direction opposite that previously supplied and such as to cause the circuit controlling member 24 to close the circuit of the trip coil 7.

Assuming now a zero power factor, that is current and voltage 90° or 270° out of phase, then one valve is conductive during a quarter of each cycle and the other valve is conductive during the next quarter of the cycle but in the opposite direction with respect to the relay winding 17, and then neither valve is conductive during the remaining half of the cycle. Consequently, the average current supplied to the relay 16 is zero and the movable element 24 remains in the position shown.

For any other power factor or phase relation between the current and the voltage, one valve will be conductive during a greater portion of each cycle that the other valve is conductive and therefore furnishes the predominating operating current. The difference between the anode currents of the valves 8 and 9 is supplied to the relay 16 in a direction depending on which valve furnishes the greater current. In the polar diagram of Fig. 4, which illustrates the operating characteristic, the heavy lines or curves indicate the difference between the valve currents under different phase relations of current and voltage from 0° to 360°, the angular position of the radial lines indicating the phase relation and their length the relative magnitude of the resultant current supplied by the valves.

In the modification of my invention shown in Fig. 2, things are so arranged that a single cathode source 25 serves to supply both valves 8 and 9 instead of having two separate sources 26 and 27, as in Fig. 1. In order to make this possible, the operating winding of the relay 16 is divided into two parts 28 and 29 connected in the anode circuits of the valves 8 and 9 respectively. In this case, each of the windings 28 and 29 has its own independent excitation circuit. The connection and arrangement of the windings 28 and 29 are such that their resultant magnetomotive force is dependent on the difference between the anode currents of the valves 8 and 9.

The operation of this modification of my invention will at once be apparent from the description given in connection with Fig. 1.

The embodiment of my invention shown in Fig. 3 is substantially the same as shown in Fig. 1 except that the relay 16 is replaced by an electric discharge valve means 30, which is arranged to be controlled in accordance with the difference between the anode currents of the valves 8 and 9. This means, as shown, includes a voltage drop producing means such as a resistor 31 which is connected in the anode circuit of the valves 8 and 9 so as to be energized in accordance with the difference between the anode currents of these valves. The voltage drop across this resistance is applied to the control electrodes 32, 33 of two electric discharge valves 34, 35, which may be of the arc discharge type, if desired. The control electrode circuits may include biasing batteries 36, 37 and current limiting resistances 38, 39, as shown. The anodes 40, 41 of the valves 34, 35 are energized in any suitable manner as from a transformer 42 and the cathodes are shown as being supplied from batteries 43, 44. In the anode circuits 46, 47 of the valves 34 and 35 respectively, there may be connected any device or load which it is desired to have operated in response to the resultant of the anode currents of the valves 8 and 9. In this way, loads of considerable magnitude can be controlled with a relatively small volt ampere demand on the circuit 5.

It will be apparent that depending on the direction of the flow of current in the resistance 31 one or the other of the valves 34, 35 will be rendered conductive. In other words, the valves 34 and 35 will be controlled selectively in accordance with the polarity of the voltage drop across the resistance 31. Thus assuming that the flow of current in the resistance 31 is in the direction from terminal 48 to terminal 49 and that the voltage drop across the resistance is high enough to overcome the bias due to the battery 37, the valve 35 will be rendered conductive and any load connected in the anode circuit of this valve will be energized. On the other hand, if current flow in the resistance 31 is from the terminal 49 to the terminal 48 and the voltage drop across the resistance is high enough to overcome the bias due to the battery 36, the valve 34 will be rendered conductive and any load connected in the anode circuit of this valve will be energized.

Although highly sensitive polarized relays with comparatively light moving elements and, therefore, small inertia effects are available, even these small effects are eliminated by the arrangement shown in Fig. 3 whereby the same selective action can be obtained directly from apparatus involving no movable elements. Where devices embodying my invention are employed in connection with power directional protection, it will be apparent that, since the potential derived from the circuit is used merely to control the conductivity of the electric discharge valves and does not directly have to cause the movement of any devices, a comparatively small voltage such as is generally present in the case of a power reversal accompanied by a fault will serve to provide the necessary protection. Moreover, inasmuch as no appreciable power load is placed upon the potential deriving source the potential may be obtained quite readily from other devices than potential transformers, examples of which are known to the art.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination with an electric circuit, power directional responsive means for controlling said circuit including a plurality of electric discharge valves each having an anode, a cathode and a control electrode, the control electrodes being connected to be energized in accordance with the voltage of said circuit and the anodes in accordance with the current of the circuit, the relative polarities of the connections being such that one of said valves is conductive with power flow in a given direction and non-conductive with power flow in the opposite direction and another of said valves is non-conductive with power flow in said given direction and conductive with power flow in the opposite direction, and means connected to be energized in accordance with the difference between the anode currents of said valves.

2. In combination with an electric circuit, power directional responsive means for controlling said circuit including two electric discharge valves each having an anode, a cathode and a control electrode, the control electrodes being connected to be energized in accordance with the voltage of said circuit and the anodes in accordance with the current of the circuit, the relative polarities of the connections being such that one of said valves is conductive with power flow in a given direction and non-conductive with power flow in the opposite direction and the other valve is non-conductive with power flow in said given direction and conductive with power flow in the opposite direction, and directional relay means including two cooperating windings respectively connected to be energized in accordance with the anode currents of said valves to exert an effect dependent upon the difference between said anode currents.

3. In combination with an electric circuit, power directional responsive means for controlling said circuit including two electric discharge valves each having an anode, a cathode and a control electrode, the control electrodes being connected to be energized in accordance with the voltage of said circuit and the anodes in accordance with the current of the circuit, the relative polarities of the connections being such that one of said valves is conductive with power flow in a given direction and non-conductive with power flow in the opposite direction and the other valve is non-conductive with power flow in said given direction and conductive with power flow in the opposite direction, voltage drop producing means connected to be energized in accordance with the difference between the currents in the anode circuits of said valves and a plurality of electric discharge valves connected to be controlled selectively in accordance with the polarity of the voltage drop across said producing means.

4. In combination with an electric circuit, power directional responsive means for controlling said circuit including two electric discharge valves each having an anode a cathode and a control electrode, the control electrodes being so connected to be energized in accordance with a voltage of said circuit as to have the same polarity, a control circuit connected to be energized in accordance with a current of the circuit to be protected and including said anodes connected in opposition and means connected in said control circuit to be energized in accordance with the difference between the anode currents of said valves.

5. In combination with an electric circuit, fault responsive protective means for controlling said circuit in accordance with the direction of power flow therein including two electric discharge valves each having an anode, a cathode and a control electrode, the control electrodes being so connected to be energized in accordance with a voltage of said circuit as to have the same polarity and the anodes being so connected to be energized in accordance with a current of the circuit as to have opposite polarities, and means connected to be energized in accordance with the difference between the currents in the anode circuits of said valves.

6. In combination with an electric circuit, fault responsive protective means for controlling said circuit in accordance with the direction of power flow therein including two electric discharge valves each having an anode, a cathode and a control electrode, the control electrodes being so connected to be energized in accordance with the voltage of said circuit as to have the same polarity and the anodes being so connected to be energized in accordance with a current of the circuit as to have opposite polarities, and directional relay means connected to be energized in accordance with the difference between the currents in the anode circuits of said valves.

7. In combination with an electric system, electroresponsive means operative in accordance with the phase relation between two coexisting similar components of electric energy derived from the system including a plurality of electric discharge valves each having an anode, a cathode and a control electrode, the control electrodes of said valves being connected to be energized in accordance with one of said components and the anodes being connected to be energized in accordance with another of said components, the relative polarities of the connections being such that one valve is conductive when a predetermined phase relation exists between said components and non-conductive when the phase relation between said components differs by substantially 180° from said predetermined phase relation and another valve is non-conductive when said predetermined phase relation exists and conductive when the phase relation between said components differs by substantially 180° from said predetermined phase relation and means connected to be energized in accordance with the difference between the anode currents of said valves.

8. In combination with an electric system, electroresponsive means operative in accordance with the phase relation between two coexisting voltages derived from the system including two electric discharge valves each having an anode, a cathode and a control electrode, the control electrode of each of said valves being connected to be energized in accordance with one of said voltages and the anodes being connected to be energized in accordance with another of said voltages, the relative polarities of the connections being such that one valve is conductive when said voltages are in phase and non-conductive when the voltages are in phase opposition and the other valve is non-conductive when said voltages are in phase and conductive when the voltages are in phase opposition and means connected to be energized in accordance with the difference between the anode currents of said valves.

9. In combination with an electric system, electroresponsive means operative in accordance with the phase relation between two coexisting voltages derived from the system including two electric discharge valves each having an anode, a cathode and a control electrode, the control electrode of each of said valves being connected to be energized in accordance with one of said voltages and the anodes being connected to be energized in accordance with another of said voltages, the relative polarities of the connections being such that one valve is conductive when a predetermined phase relation exists between said voltages and non-conductive when the phase relation between the said voltages differs by substantially 180° from said predetermined phase relation and the other valve is non-conductive when said predetermined phase relation exists and conductive when the phase relation between the said quantities differs by substantially 180° from said predetermined phase relation, and relay means including two cooperating windings respectively connected to be energized in accordance with the anode currents of said valves to exert an effect dependent upon the difference between the anode currents.

10. In combination with an electric system, electroresponsive means operative in accordance with the phase relation between two coexisting voltages derived from the system including two electric discharge valves each having an anode, a cathode and a control electrode, the control electrodes being so connected to be energized in accordance with voltages derived from the system as to have the same polarity and the anodes being so connected to be energized in accordance with a voltage derived from the system as to have opposite polarities, voltage drop producing means connected to be energized in accordance with the difference between the currents in the anode circuits of said valves and a plurality of electric discharge valves connected to be controlled selectively in accordance with the polarity of the voltage drop across said producing means.

11. In combination with an electric system, electroresponsive means operative in accordance with the phase relation between two coexisting voltages derived from the system including two electric discharge valves each having an anode, a cathode and a control electrode, the control electrode of each of said valves being connected to be energized in accordance with one of said voltages and the anodes being connected to be energized in accordance with another of said voltages, the relative polarities of the connections being such that one valve is conductive when a predetermined phase relation exists between said quantities and non-conductive when the phase relation between said quantities differs by substantially 180° from said predetermined phase relation and the other valve is non-conductive when said predetermined phase relation exists and conductive when the phase relation between said quantities differs by substantially 180° from said predetermined phase relation, voltage drop producing means connected to be energized in accordance with the difference between the currents of the anode circuits of said valves and two electric discharge valves connected to be controlled selectively in accordance with the polarity of the voltage drop across said producing means.

12. In combination with an electric system, electroresponsive means operative in accordance with the phase relation between two coexisting voltages derived from the system including two electric discharge valves each having an anode, a cathode and a control electrode, the control electrodes being so connected to be energized in accordance with one of said voltages as to have the same polarity and the anodes being so connected to be energized in accordance with another of said voltages as to have opposite polarities and means connected to be energized in accordance with the difference between the currents in the anode circuits of said valves.

ALAN S. FITZ GERALD.